W. H. CURTIS.
Sucker-Rod Adjuster.
No. 196,564. Patented Oct. 30, 1877.
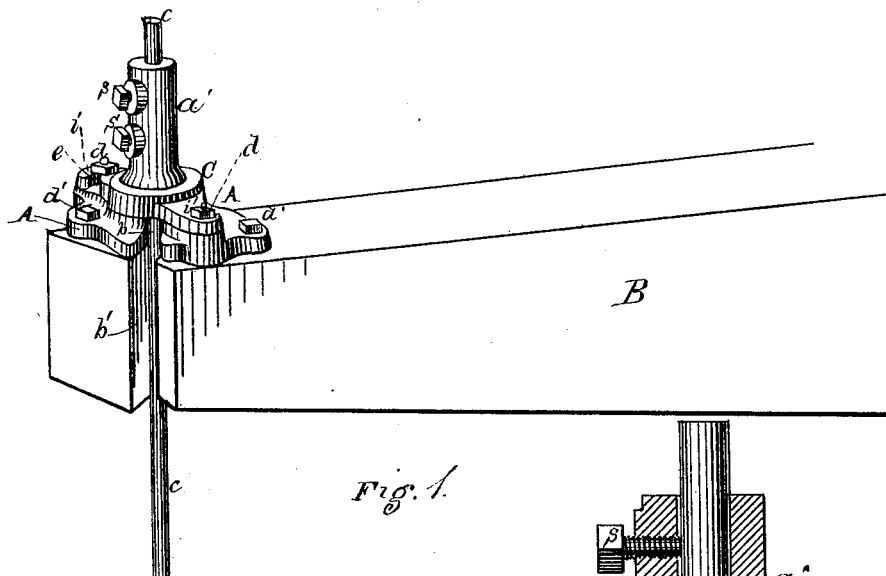
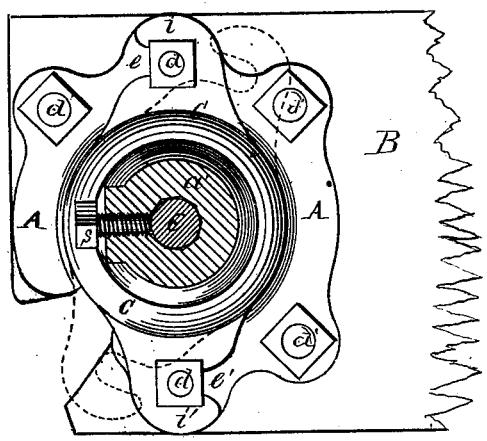
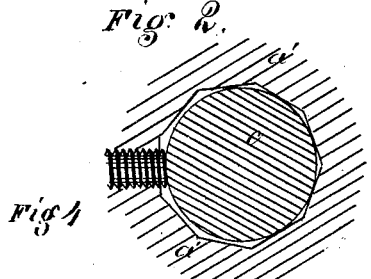

UNITED STATES PATENT OFFICE.

WILLIAM H. CURTIS, OF OIL CITY, PENNSYLVANIA, ASSIGNOR TO HIMSELF AND ROBERT R. ARMOR, OF SAME PLACE.

IMPROVEMENT IN SUCKER-ROD ADJUSTERS.

Specification forming part of Letters Patent No. 196,564, dated October 30, 1877; application filed September 22, 1877.

*To all whom it may concern:*

Be it known that I, WILLIAM H. CURTIS, of Oil City, county of Venango, State of Pennsylvania, have invented or discovered a new and useful Improvement in Sucker-Rod Adjusters or Equalizers; and I do hereby declare the following to be a full, clear, concise, and exact description thereof, reference being had to the accompanying drawings, making a part of this specification, in which—like letters indicating like parts—

Figure 1 is a perspective view of my improved sucker-rod adjuster as applied to the walking-beam of an oil-well pump. Fig. 2 shows a cross-section of the same through the line $x\ x$, Fig. 3. Fig. 3 shows a vertical section, and Fig. 4 is an enlarged view of the cross-section shown in Fig. 2.

My improvement relates to a sucker-rod adjuster, which is jointed or pivoted to the walking-beam of the pump by means of a ball-and-socket joint, the polished rod being clamped to the adjuster by means of binding-screws.

In the drawings, A represents the supporting or base plate of my improved adjuster, which may be secured to the end of the walking-beam on its upper side or face, in any convenient way, as by the bolts $d'$.

C is the upper plate or cap, which rests upon the plate A, and may be secured thereto by bolts $d$ passing through both plates. These plates A and C are recessed on their adjacent faces, so that together they form a socket for inclosing a ball, $a$, as shown in Fig. 3, and thus form the ordinary ball-and-socket joint.

A slot or opening, $b$, is also made from the front edge of the plate A to the socket-recess, through which the rod $c$ may be passed, as presently described; and in order to make the plate C readily removable, so as to release the inclosed ball $a$, I prefer to make openings or slots $e\ e'$ to the bolt-holes. Hooks $i\ i'$ are thus formed, opening on opposite sides of the arms of the plate, and by turning the plate, as shown by dotted lines, Fig. 2, the hooks may be released from or caused to engage with the bolts $d$ at pleasure.

The outer openings from the socket-recess in the plates A and C should be large enough to permit the parts connected with or passing through the ball some range of motion.

The head-piece consists of the ball $a$ and sleeve or stem $a'$. These parts constitute one piece. The ball $a$ is made to fit the socket formed by the two plates A and C, and the sleeve or stem $a'$ is made of sufficient length to furnish a good bearing-surface for clamping the inclosed rod $c$. This rod is usually polished, so as to work through a stuffing-box, and in order to clamp it securely I make a polygonal hole longitudinally through the ball and sleeve of about the size of the rod $c$. Clamping or binding screws $s$ work through the wall of the sleeve and bind the rod $c$ in the desired position of adjustment.

The difficulty which has heretofore attended the clamping of sucker-rods by set-screws has arisen from the fact that a round hole, seat, or socket has been used in which the rod was bound, and as, in practice, the rod is always a little smaller than such hole, the rod is clamped on two sides only, and as it is difficult to get these bearings perfectly true, the rod will soon work loose. By making the hole which surrounds the rod of several sides instead of round, and placing the binding-screws opposite an angle between the sides, I secure at least three bearings, as shown in Figs. 2 and 4, and secure a better connection than can be done under the same conditions with a round hole.

In operation, the cap C is placed upon the upper half of the ball $a$, and the screws $s$ put in place. This ball and sleeve is then put upon the rod $c$, as shown in the drawing, and is securely clamped to the same at such point on the rod that, when the several parts are in place, the piston or sucker on the lower end of the rod shall be at the proper working-point in the well.

In order now to make connection with the plate A and beam B, I pass the rod $c$, by a lateral movement, through the slot $b$, and seat the ball $a$ in the socket in the plate A. The cap C is then turned until the hooks $i\ i'$ engage the bolts $d$ on the under side of the nuts, when the connection will be complete.

If it is desired at any time to clamp the rod $c$ at some different point, it may be done by simply releasing the screws $s$, and moving the rod up or down within the sleeve to the desired point.

By unlocking the cap C from the bolts $d$, as described, the rod $c$ and attached devices may be removed from the plate A through the opening $b$, at pleasure.

By making use of a ball-and-socket joint at the point of connection with the walking-beam, I provide for the irregular movement of the walking-beam better than can be done with joints which are movable only in one plane; and this feature is especially important in oil-well machinery, as it is usually put up with but little care or accuracy.

Instead of making the opening $b$ $b'$ in the end of walking-beam and plate A, a hole may be made near the end of the beam, through which the rod $c$ may be passed, as shown in Fig. 3. In order, then, to disconnect the rod $c$ from the beam, the screws $s$ are loosened, and the beam and adjusting-clamp are slipped off the upper end of the rod.

I claim herein as my invention—

1. The combination of rod $c$, head or sleeve $a$ $a'$, having a polygonal hole through the same for the reception of the rod, and one or more binding-screws for clamping the rod, substantially as set forth.

2. The combination of plates A and C, of suitable form for attachment to a walking-beam, and properly recessed for the reception of a perforated ball, substantially as set forth.

3. A base-plate recessed on one side, in combination with a detachable top plate, a ball-and-socket joint, and piston-rod, substantially as set forth.

In testimony whereof I have hereunto set my hand.

WILLIAM H. CURTIS.

Witnesses:
J. J. McCORMICK,
CLAUDIUS L. PARKER.